US 6,405,208 B1

(12) United States Patent
Raghavan et al.

(10) Patent No.: US 6,405,208 B1
(45) Date of Patent: Jun. 11, 2002

(54) DYNAMIC RECURSIVE BUILD FOR MULTIDIMENSIONAL DATABASES AND METHODS AND APPARATUS THEREOF

(75) Inventors: Srinivasan Sundar Raghavan, San Jose; Rama Murthy Penumarti, Fremont, both of CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 0 days.

(21) Appl. No.: 09/460,536

(22) Filed: Dec. 13, 1999

(51) Int. Cl.[7] ............................................. G06F 17/30
(52) U.S. Cl. .................. 707/102; 707/100; 707/101; 707/103; 707/104
(58) Field of Search ................ 707/3, 1, 100, 707/201, 203, 102, 101, 103, 104

(56) References Cited

U.S. PATENT DOCUMENTS

| | | | | | |
|---|---|---|---|---|---|
| 5,359,724 A | * | 10/1994 | Earle | ............................... | 707/3 |
| 5,721,910 A | * | 2/1998 | Unger et al. | ................. | 707/100 |
| 5,852,819 A | * | 12/1998 | Beller | ............................ | 707/1 |
| 5,864,857 A | * | 1/1999 | Ohata et al. | ................. | 707/100 |
| 5,890,151 A | * | 3/1999 | Agrawal et al. | ................ | 707/5 |
| 5,905,985 A | * | 5/1999 | Malloy et al. | .............. | 707/100 |
| 5,926,818 A | * | 7/1999 | Malloy | ......................... | 707/100 |
| 5,940,818 A | * | 8/1999 | Malloy et al. | .................. | 707/2 |
| 5,943,668 A | * | 8/1999 | Malloy et al. | .................. | 707/3 |
| 5,978,796 A | * | 11/1999 | Malloy et al. | .................. | 707/3 |
| 6,073,140 A | * | 6/2000 | Morgan et al. | ............. | 707/203 |
| 6,122,636 A | * | 9/2000 | Malloy et al. | .................. | 707/102 |
| 6,154,766 A | * | 11/2000 | Yost et al. | .................... | 709/201 |
| 6,182,060 B1 | * | 1/2001 | Hedgcock et al. | .............. | 707/1 |
| 6,205,447 B1 | * | 3/2001 | Malloy | ......................... | 707/102 |

OTHER PUBLICATIONS

Zhao et al., Array–Based Evaluation of Multi–Dimensional Queries in Object Oriented Database Systems, IEEE, Data Engineering, 1998 Proceedings, 14th International Conference, pp. 241–249, Feb. 1998.*

Brigham et al., An N–Dimensional Data Structure in Support of Elecltronic Data Interchange (EDI) Translation, ACM, Proceedings of the International Conference on APL, pp. 71–79, 1991.*

E.F. Codd et al., "Providing OLAP to User–Analysts: An IT Mandate," white paper published by Codd & Date, Inc., 1993.

* cited by examiner

Primary Examiner—Frantz Coby
(74) Attorney, Agent, or Firm—Beyer Weaver & Thomas, LLP

(57) ABSTRACT

This invention relates to storing and retrieving data from multidimensional databases. In accordance with one aspect of the invention, methods for producing multidimensional output suitable for presenting several aspects of a problem, are disclosed. The multidimensional output can be generated more quickly and efficiently without requiring normalization of data prior to creation of multidimensional output.

38 Claims, 12 Drawing Sheets

| Region | Sub-Region | Regional ID |
|---|---|---|
| U.S. | West Coast | 01 |
| West Coast | California | 02 |
| California | San Diego | 03 |
| California | Los Angeles | 03 |
| San Diego | La Jolla | 04 |

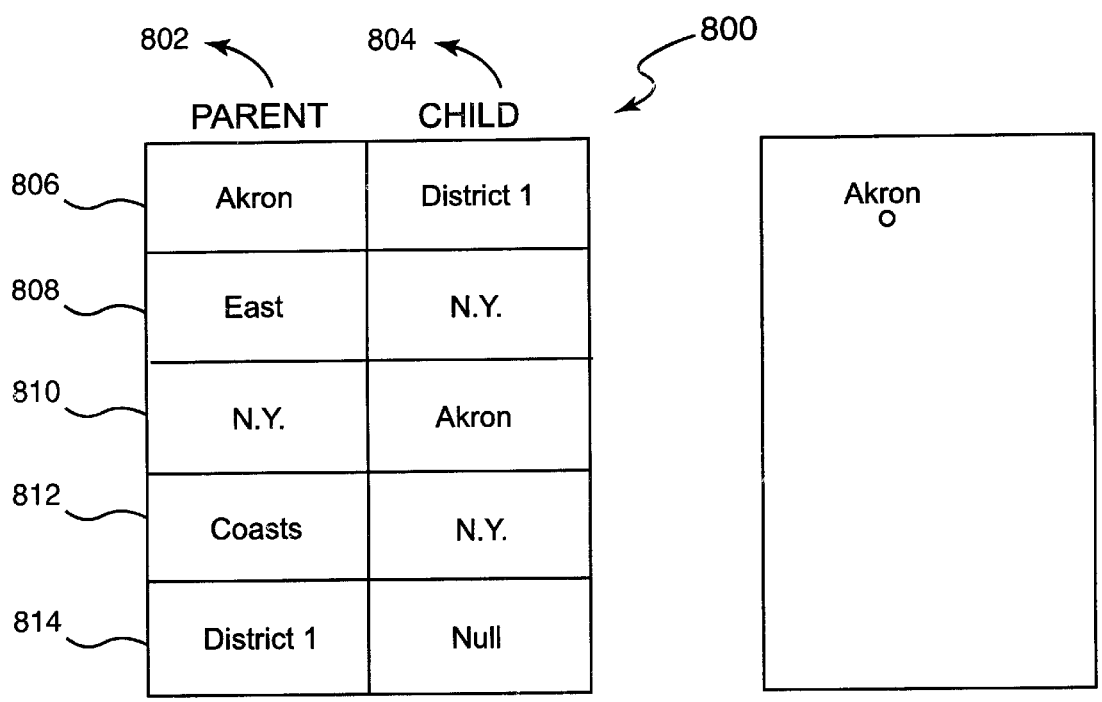
*Figure 8A*
*Figure 8B*
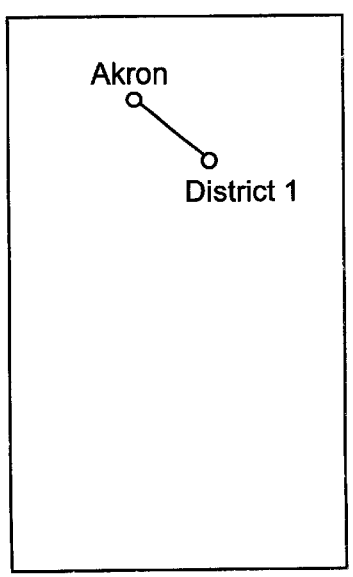
*Figure 8C*
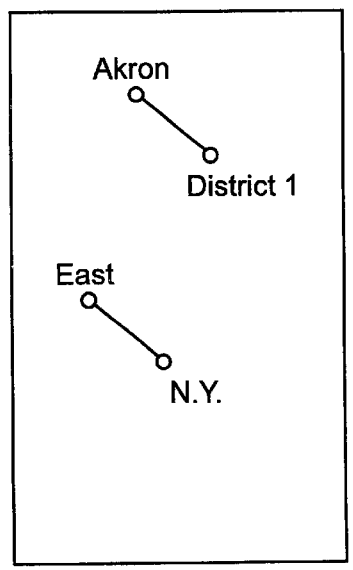
*Figure 8D* ly, the present invention relates to
DYNAMIC RECURSIVE BUILD FOR MULTIDIMENSIONAL DATABASES AND METHODS AND APPARATUS THEREOF

BACKGROUND OF THE INVENTION

1. Field of the Invention

The present invention relates generally to electronic databases. More particularstoring and retrieving data from multidimensional databases.

2. Description of the Related Art

One general category of application software is often referred to as a database management program or simply a database application. Encompassed within this general category are database systems referred to commercially as multidimensional databases or, in technical discussions, as Online Analytical Processing (OLAP) data stores. The OLAP paradigm is described in the white paper entitled "Providing OLAP (On-line Analytical Processing) to User-Analysts: An IT Mandate" by E. F. Codd, S. B. Codd, and C. T. Salley published by Codd & Date, Inc., and incorporated by reference herein for all purposes.

Typically, a multidimensional database stores and organizes data in a way that better reflects how a user would want to view the data than is possible in a spreadsheet or relational database file. Multidimensional databases are better suited generally to handle applications with large volumes of numeric data and that require calculations on numeric data, such as business analysis and forecasting.

A dimension within multidimensional data is typically a basic categorical definition of data in a database outline (discussed in greater detail below). A multidimensional database can contain several dimensions thereby allowing analysis of a large volume of data from multiple viewpoints or perspectives. Thus, a dimension can also be described as a perspective or view of a specific dataset. A different view of the same data is referred to as an alternative dimension. A data management system that supports simultaneous, alternative views of datasets is said to be multidimensional. Using a business application as an example, dimensions are items such as TIME, ACCOUNTS, PRODUCT LINES, MARKETS, DIVISIONS, and so on. Within each dimension, there is typically a consolidation or other relationship between items.

Information in a database can be stored and maintained in various data structures. To facilitate discussion, FIG. 1A is a simplified representation of an exemplary database table 100. Data table 100 can be used to store information relating to different products that are available for sale in a department store. As shown in FIG. 1A, data table 100 can include a product ID, a product category, a product sub-category, and a product level.

Each product category, e.g., "clothing", "men's clothing", etc. can be assigned a unique product ID. Information relating to a particular product category can be accessed using its product ID. For example, product ID "2" in table 100 uniquely identifies "informal wear". Thus, by looking up product ID "2" in table 100, other information such as the fact that product categories "jeans" and "t-shirts" are sub-categories of "informal wear" can be ascertained.

Other information relating to product categories can be maintained in another table, sales table 110 of FIG. 1B. As shown in FIG. 1B, the sales table 110 includes specific information relating to sale of products, e.g., "retail ID", "current price", and "number sold this year." For example, Information related to the "current price" for "Jeans" can be obtained by accessing the table 110 using "3" as the product ID and looking up the appropriate column, i.e., "current price".

FIG. 1C depicts another informational aspect (dimension) related to a department store. Namely, the organizational arrangement ("topology") of the department store. Similar to product table 100, each particular region shown in FIG. 1C, e.g., "U.S.", "West Coast" can be assigned a unique regional ID. Information relating to topology of a particular region can be accessed using the regional ID that uniquely identifies that region.

As is known in the art, the Information maintained in a database, e.g., information in data tables shown in FIGS. 1A–1C, can be used to solve various analytical problems. By way of example, the department store can use the information kept in its database to solve problems of having to keep track of inventory, sales, employee records and salaries, and so on. In order to address an analytical problem, it is often necessary to combine information maintained in several database tables. In addition, an analytical problem may be related to one or more dimensions of data. By way of example, the user may wish to now the 3-rd quarter sales for a product category and all its sub-categories (e.g., "informal wear" with subcategories of "jeans" and "T-shirts") for a regional store and its sub-regions (e.g., San Diego with its sub-region of La Jolla). This problem involves at least two dimensions related to the general category of"sales", namely, the dimensions of "products" and "topology". Thus, in that example, the information in tables shown in FIGS. 1A–C need to be combined (merged) to adequately generate the desired sale reports.

Moreover, it is useful to have the solution organized and presented in a way that better reflects how a human would want to view the data. To elaborate, there is an implicit hierarchical (parent-child) relationship between the product categories of database table 100. For example, "informal wear" is a child of "clothing" and a parent of both "jeans" and "T-shirts". The hierarchical relationship present in table 100 is illustrated in FIG. 2A, where, for example, "Informal wear" is represented as a child of "men's clothing" and as a parent of both "jeans" and "T-shirts". The graphical presentation illustrated in FIG. 2A is better suited for human perception and comprehension. This is evident from a quick comparison of FIG. 1A to FIG. 2A. As another example, FIG. 2B illustrates the hierarchical relationship present in FIG. 1C. Again, the graphical representation of FIG. 2B is a more desirable presentation to a user.

As mentioned earlier, the multidimensional databases have the ability to present a user with several different views (dimensions) of data. To facilitate understanding, a multidimensional solution provided by a multidimensional database can be represented by a multidimensional structure, e.g., a cube 120 of FIG. 2C wherein each side of the cube 120 can present the user with a different dimension of data. For example, sides 122 and 124 of the cube 120 can contain the hierarchical relationships depicted in FIGS. 2A and 2B respectively.

Recently, there have been significant developments in the area of multidimensional databases. However, primarily "brute force" approaches have been used to generate multidimensional outputs without much regard to overall cost and efficiency. As is known in the field, brute force approaches generally require making several passes through relevant tables in a database, of which there maybe many, to ultimately generate an appropriate multidimensional output.

By way of example, in order to generate a multidimensional output that adequately addresses the problem of determining the 3-rd quarter sales for a product category and its sub-categories for a regional store and its sub-regions, several passes through tables shown in FIGS. 1A–1C would have to be made. Consequently, brute force approaches are inefficient and expensive with respect to system resources. In addition, since making several passes through a database table requires significant amount of time, brute force approaches are not suitable for multidimensional databases where it is desirable to quickly present the user with several dimensions of data on demand ("on the fly").

Another approach for generating multidimensional outputs is to "normalize" data. Normalization of data generally puts data in a format that is more readily suitable for generation of multidimensional output. Database table 130 of FIG. 2D illustrates how the hierarchical relationship present in table 1A (also illustrated in the tree representation of FIG. 2A) may be normalized. As illustrated in FIG. 2D parent-child relationships between product categories can be maintained in a format that is more suitable for generation of multidimensional outputs. For example, row 132 contains the hierarchical relationship between "clothing", "men's clothing", "informal wear", and "jeans".

Although normalized data is more suitable for generation of multidimensional outputs, normalization of data has many disadvantages and limitations. One disadvantage is that generation of normalized data requires significant amount of time and resources. Thus, normalization of data is an inefficient way to generate multidimensional outputs. More specifically, static allocation of normalized tables imposes an unnecessary waste of resources and does not easily allow dynamic build or modification of the hierarchical relationships.

In view of the foregoing there is a need for improved methods for storing and retrieving data from multidimensional databases.

SUMMARY OF THE INVENTION

Broadly speaking, the invention relates to methods, apparatus, and data structures suitable for storing and retrieving data from multidimensional databases. In one aspect, the invention pertains to generation of multidimensional output suitable for presenting several aspects (dimensions) of a problem related a multidimensional database. The information used to solve the analytical problem is typically maintained in a source database. The invention can be implemented in numerous ways, including as a device, an apparatus and a method. A few embodiments of the invention are discussed below.

In accordance with one embodiment of the present invention, a multidimensional integration system suitable for accessing a source database is disclosed. The multidimensional integration system includes a multidimensional data integrator that accesses a source database to generate instructions necessary to produce multidimensional output. The multidimensional data integrator can use an Application Program Interface (API) to communicate with a multidimensional server that ultimately produces the multidimensional output.

In accordance with another embodiment of the present invention, a method for producing multidimensional output from a source database is disclosed. The multidimensional output provides a solution to a problem relating to one or more dimensions of data associated with the source database. An application relating to one or more dimensions of data is defined. The dimensions of data are associated with the source database. In addition, a Meta-model for the application is defined. The Meta-model relates to the one or more dimensions of data associated with the source database. Further, a Meta-outline is created for the application. The Meta-outline includes at least one dimension of data. Furthermore, multidimensional output is generated based on at least one hierarchical relationship defined for the source database and relating to the application. The multidimensional output provides a solution to the problem related to the application.

This invention has numerous advantages. One advantage is that multidimensional output can be generated more quickly and efficiently in a manner that is more suitable for multidimensional database environments. Another advantage is that this invention does not require normalization of data prior to creation of multidimensional output. Thus, a source database can remain in its original relational format. Still another advantage of the invention is that it is cost effective and relatively simple implementations are possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention generally relates to databases. Broadly speaking, the invention relates to methods, apparatus, and data structures suitable for storing and retrieving data from multidimensional databases. In one aspect, the invention pertains to generation of multidimensional output suitable for presenting several aspects (dimensions) of a problem related a multidimensional database. The information used to solve the analytical problem is typically maintained in a source database.

Embodiments of this aspect of the invention are discussed below with reference to FIGS. 3–8. However, those skilled in the art will readily appreciate that the detailed description given herein with respect to these figures is for explanatory purposes as the invention extends beyond these limited embodiments.

Figure 3:
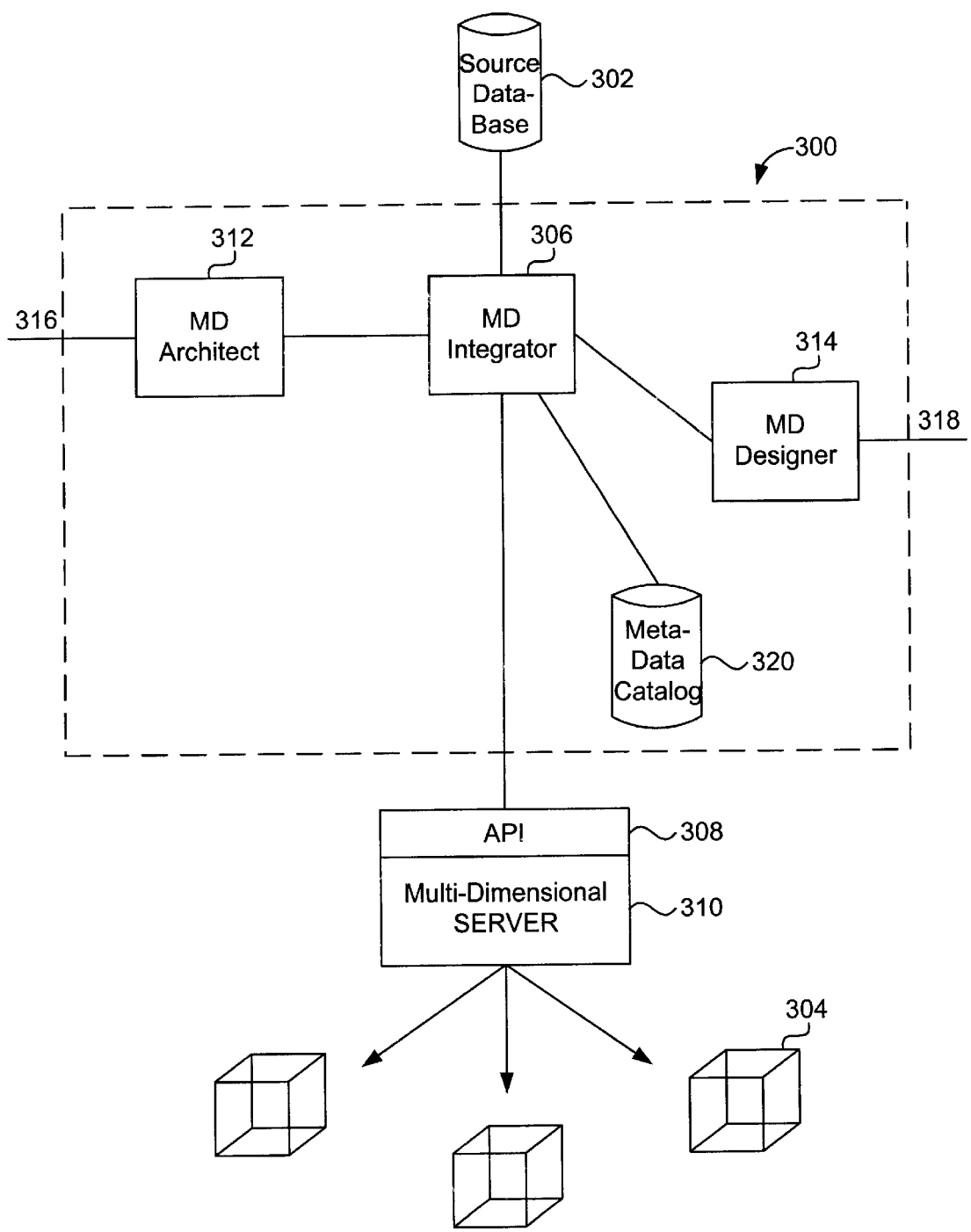
FIG. 3 illustrates an exemplary multidimensional integrator system, in accordance with one embodiment of the present invention.

FIG. 3 is a diagrammatic representation of an exemplary multidimensional integration system 300 in accordance with one embodiment of the present invention. The multidimensional integration system 300 accesses a source database 302 to obtain information needed to produce a multidimensional output, e.g., a cube 304. More particularly, a multidimensional data integrator 306 accesses source database 302 and generates instructions necessary to produce a multidimensional output. The multidimensional data integrator 306 can use an Application Program Interface (API) 308 to communicate with a multidimensional server 310 that ultimately produces the multidimensional output, e.g., cube 304.

Source database 302 is generally in a relational format, e.g., Oracle, DB2, Informix, or SQL server. However, it should be noted that source database 302 can be any historical data record. It should also be noted that the source data base 302 could have files that are in a VSAM or ISAM format provided that a mechanism (e.g., a gateway) allows access to source data base 302 in a relational format. Source database 302 can include a number of tables where data is maintained.

The multidimensional data Integrator 306 can also interact with a multidimensional architect 312 and a multidimensional designer 314. Multidimensional architect 312 is generally used to define a Meta-model to solve a multitude of analytical problems related to a general problem category. By way of a simple example, a general problem category can be sales of products sold in a department and a particular problem related to the general category of "sales" could be the 3-rd quarter sales of a particular product category sold in certain stores.

Figure 1A:
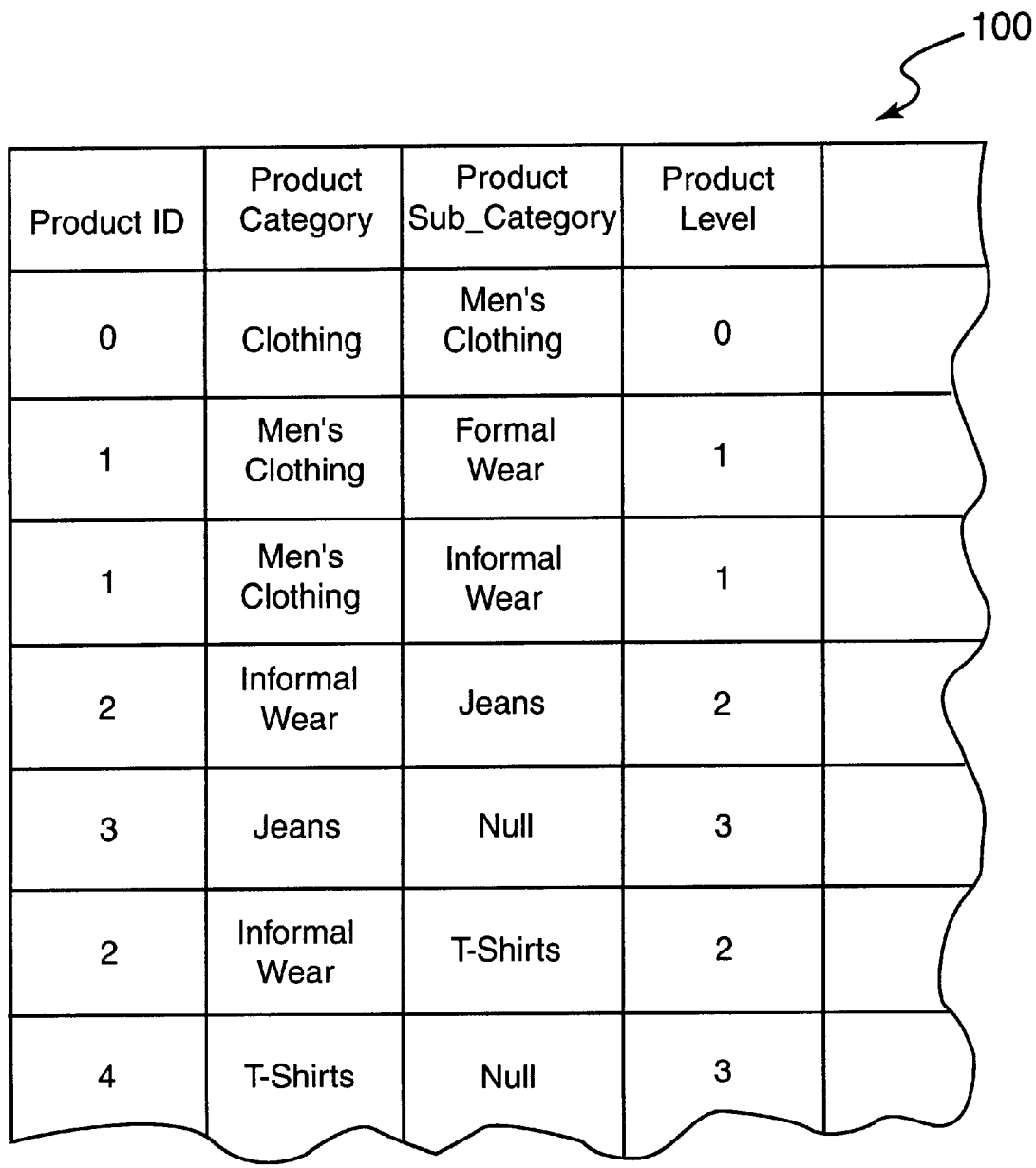
FIGS. 1A–C illustrate simplified database table of a source database.

Once a general problem category is defined information needed to solve problems relating to that general problem category can be identified in source database 302. By way of example, this information may be in the form of a multitude of database tables that is maintained in source database 302. (E.g., if the general problem category is product sales for a department store, the information needed to solve problems relating to product sales can include database tables such as those shown in FIGS. 1A–1C).

The Meta-model can be defined based on an input 316 that is provided to the multidimensional integrator system 300. A user can provide the Input 316 to multidimensional architect 312, in accordance with an embodiment of the present invention. However, in order to provide an input to define a Meta-model, a user may alternatively or additionally interact with other components of multidimensional integrator 300 without departing from the scope or spirit of the invention. For example, the user may additionally interact with multidimensional data integrator 306. The user who provides the input 316 is typically someone familiar with the source database e.g., a system administrator. In this manner, the Meta-model can be defined solely or partially based on an input from a user and/or system administrator of the multidimensional integrator system 300. Based on the Meta-model a variety of multidimensional outputs can be generated. The Meta-model conceptually represents all the multidimensional outputs that can be generated from it.

After the Meta-model has been created, multidimensional designer 314 is utilized to create a "Meta-outline" that can be based on the Meta-model. Broadly speaking, the Meta-outline is an abstraction of a specific set of multidimensional output that can be created based on the corresponding Meta-model. The multidimensional output is generated to solve a particular problem that is related to a general problem category. By way of a simple example, a particular business problem in a general problem category of "sales" could be the 3-rd quarter sales for products under category "informal wear" ("jeans" and T-shirts") in the region "California." (see FIGS. 1A–1C). In this simple example, at least 2 dimensions need to be considered, namely, the dimensions of "products" and "topology."

Figure 2A:
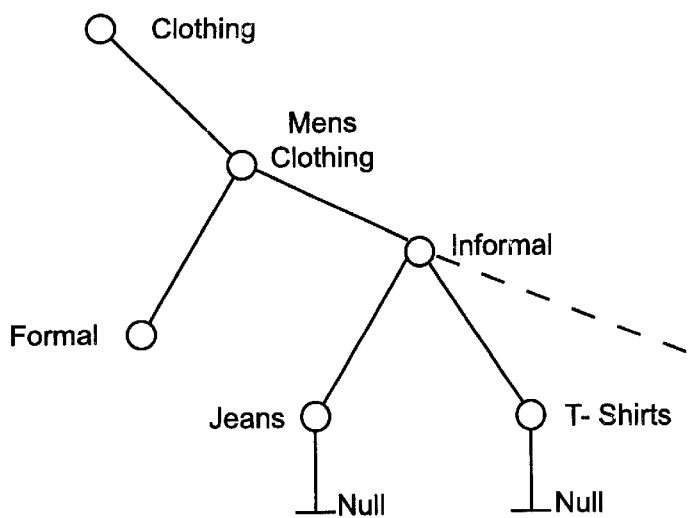
FIGS. 2A–C illustrate hierarchical relationship for the database tables of FIGS. 1A–C.
Figure 2B:
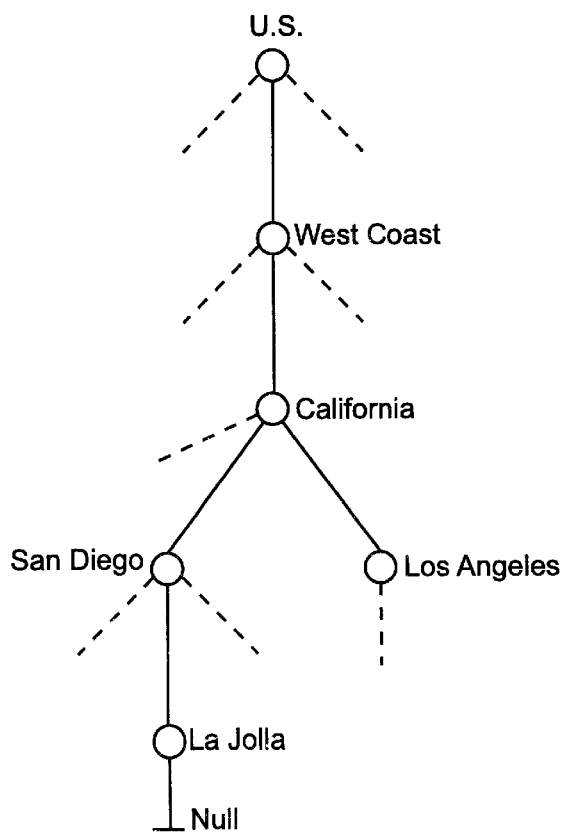
Figure 2C:
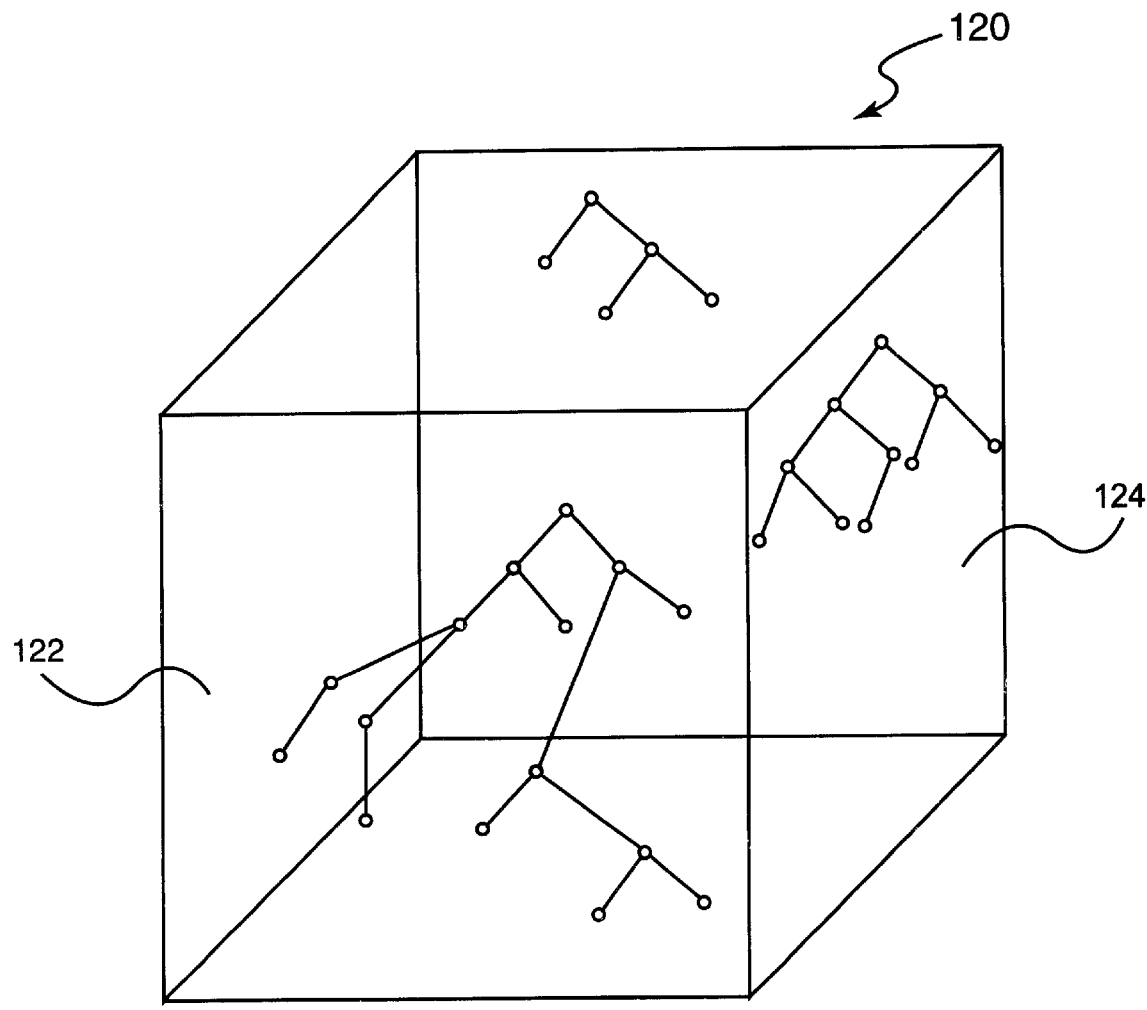
Figure 2D:
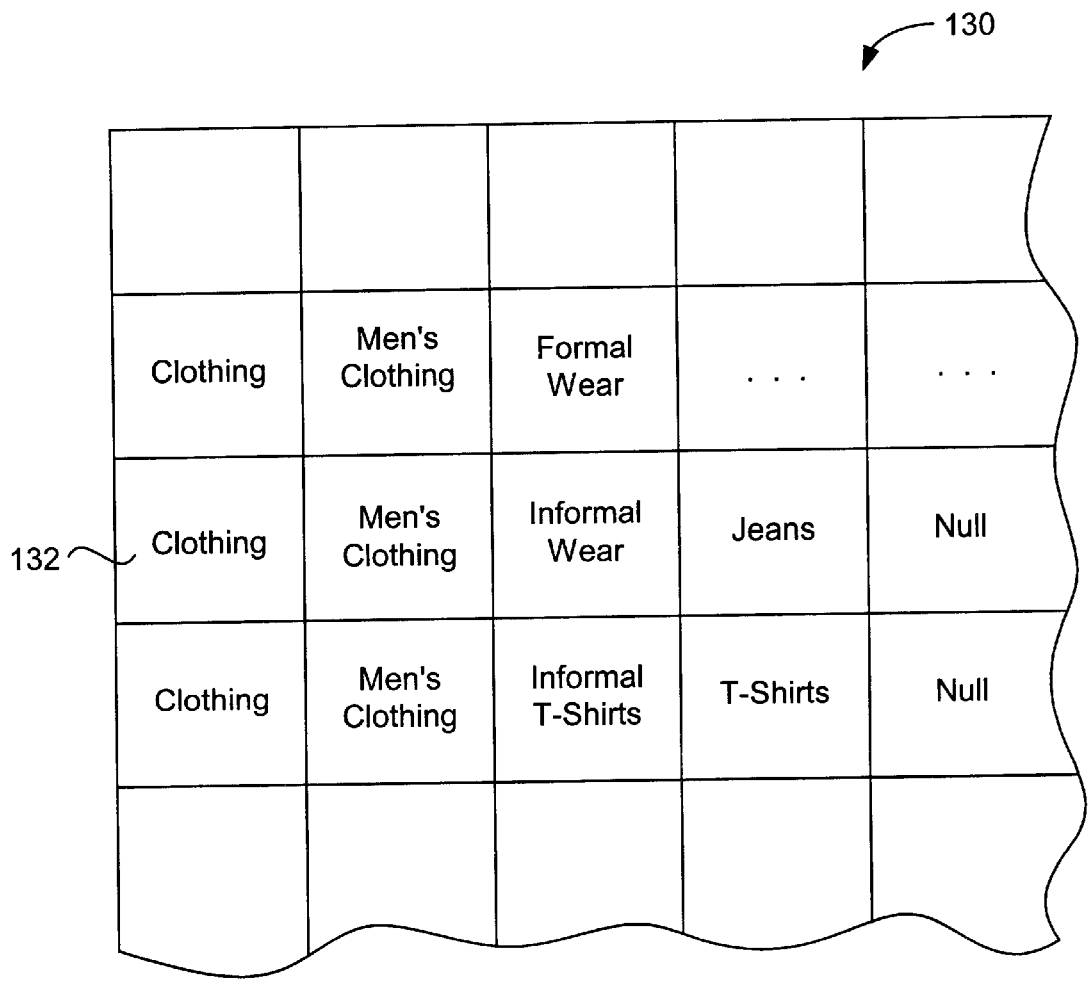
FIG. 2D is a simplified representation of a multidimensional output in the form of a cube.

In order to create a "Meta-outline, for each dimension that needs to be considered, a hierarchical relation is identified. By way of example, for the dimension "products" the hierarchical relationship "product.category/product.subcategory" can be defined. This definition provides an abstraction that adequately defines the relationship between all the nodes in the tree illustrated in FIG. 2A. This abstract hierarchical relationship can be applied recursively to generate the tree illustrated in FIG. 2A. By way of example, starting at node "clothing" the hierarchical definition "product.category/product.subcategory" can be applied to describe the relationship between the category of "clothing" and its subcategory "informal wear." The hierarchical definition "product.category/product.subcategory" can again be applied to the category "informal wear" and its subcategory "jeans", and so on.

The "Meta-outline" can be defined based on an input 318. The input 318 can be provided to the multidimensional architect 314 by a user, in accordance with one embodiment of the present invention. However, a user may alternatively or additionally interact with other components of multidimensional integrator 300 without departing from the scope or spirit of the invention. For example, the user may only interact with the multidimensional data integrator 306. The user is typically someone familiar with or having an interest in solving a particular analytical problem, e.g., the user maybe a business administrator of a department store. In this manner, a "Meta-outline" can be created as an abstraction of a multidimensional output.

Once a Meta-outline has been created, it can be stored in a Meta-data catalog 320, in accordance with a preferred embodiment of the present invention. It should also be noted that a Meta-model can also be stored in the Meta-data catalog 320. In addition to a Meta-outline and a Meta-model, the Meta-data catalog can also be used to store other information needed to create a multi-dimensional output. Meta-outline, Meta-model, and any other information that maybe necessary to generate a multidimensional output is referred to herein as "Meta-data".

Among other things, Meta-data catalog can provide faster and more efficient access to information needed to create a multidimensional output. In addition, information saved in the Meta-data catalog can be used to re-generate the same or similar multi-dimensional outputs. Saving Meta-data in a catalog is especially useful if the Meta-data will be used frequently to regenerate multidimensional outputs.

In accordance with a particular embodiment of the present invention, based on the Meta-data, the multidimensional data integrator 306 generates instructions necessary to produce a multidimensional output e.g., a cube 304. As depicted in FIG. 3, multidimensional data integrator 306 can access the multidimensional server 310 by using Application Program Interface (API) 308. By way of example, this API can be in the form of a set of SQL instructions.

Figure 4:
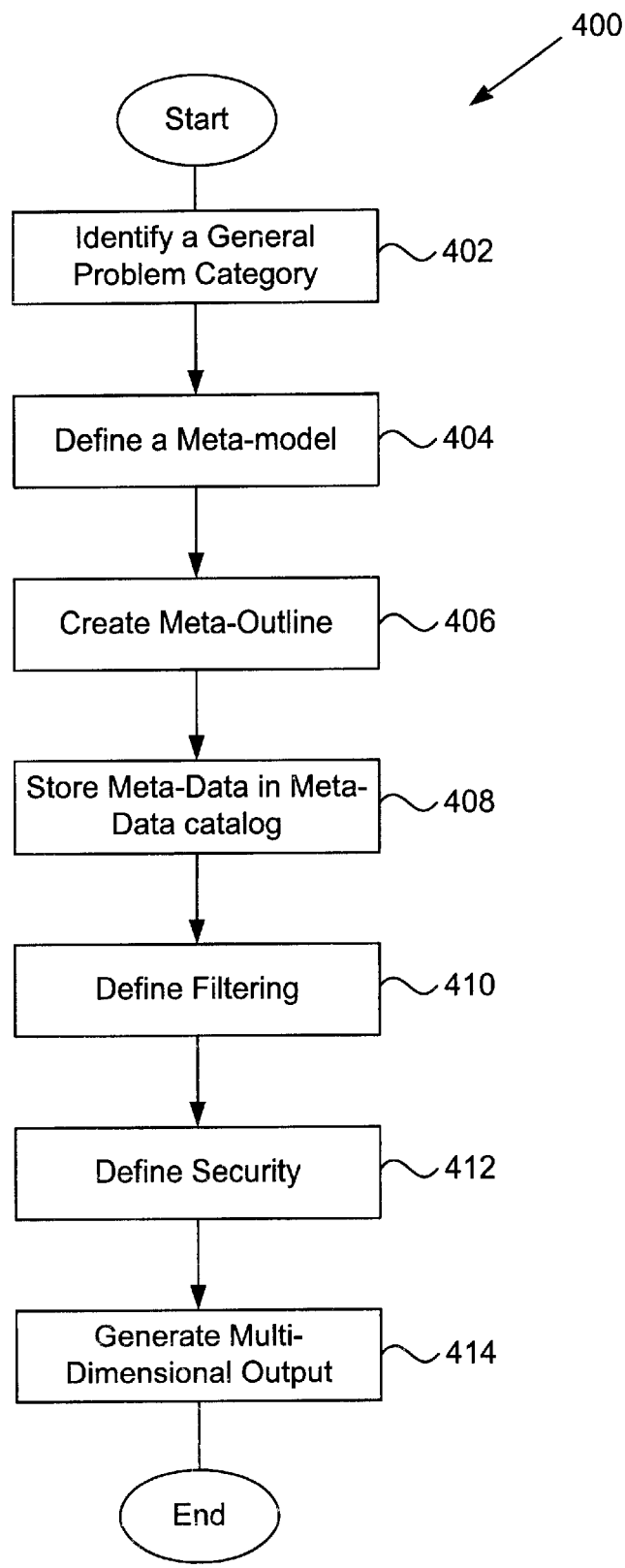
FIG. 4 illustrates a method of producing multidimensional output, in accordance with another embodiment of the present invention.

FIG. 4 is a flow chart representation of a method 400 for creating a multidimensional output, in accordance with a preferred embodiment of the present invention. Initially, as noted by operation 402 a general problem category is identified. As mentioned above, by way of example, the general problem category can be "sales" of different products in a department store.

Next, a Meta-model suited for solving the identified general problem category is defined, as indicated by operation 404. As mentioned with respect to FIG. 3, a Meta-model can be defined in response to input provided by a user. Defining a Meta-model is discussed in greater detail with respect to FIG. 5. After a Meta-model is defined, a Meta-outline is created as noted by operation 406. In accordance with a particular embodiment, the Meta-outline is created based on a Meta-model. Broadly speaking, a Meta-outline is an abstraction of the multidimensional output that addresses a particular analytical problem. The Meta-outline can be created based on input provided by a user. The user is typically interested in solving a particular problem relating to the general problem category defined in operation 402.

In operation 408 Meta-data, which includes the Meta-outline, is stored in a Meta-data catalog. As mentioned earlier, Meta-model, Meta-outline, and any other information necessary to produce a multidimensional output can be optionally saved in a Meta-data catalog. In addition to storing Meta-data in a Meta-data catalog, any desired filtering of data (or Meta-data) can also be optionally defined, as indicated by operation 410. Filtering of data as used herein generally refers to any desirable processing of data. By way of a simple example, filtering can be done to focus on a few parameters that are of interest and to effectively ignore parameters that the user does not wish to view, e.g., "retail ID" of FIG. 1B. Filters can be defined based on input provided by a user or be predefined for all users. It should be noted that defining and/or performing filtering can also be done when a Meta-model is defined in operation 402 and/or a Meta-outline is created in operation 408. Thus, filtering of data can be done before or after Meta-data is created. Filtering of data can be based on input provided by a user.

As noted by operation 412, security parameters can also be optionally defined. Among other things, security parameters can be defined to generally control and/or limit user access to information. Although in FIG. 4, security parameters are defined after filters are defined, it should be noted that security information can also be defined before filters are defined. Security parameters can also be defined while the Meta-model is defined an/or the Meta-outline is created. As will be appreciated by those skilled in the art, security parameters can also be implicitly defined when a Meta-model is defined and/or a Meta-outline is created. By way of example, a Meta-model and/or Meta-outline can be defined and created in such a way to effectively limit access to certain parameters of the database.

Finally, multidimensional output is generated as noted by operation 414. In accordance with a particular embodiment of the present invention, multidimensional output is generated based on Meta-data stored in the Meta-data catalog. The generated multidimensional output provides a solution for an analytical problem. This analytical problem is a particular problem outlined by the Meta-outline created in operation 406. The particular problem is related to a general problem category defined by operation 402. The multidimensional output generated in operation 414 advantageously presents a user with multiple dimensions.

Figure 5:
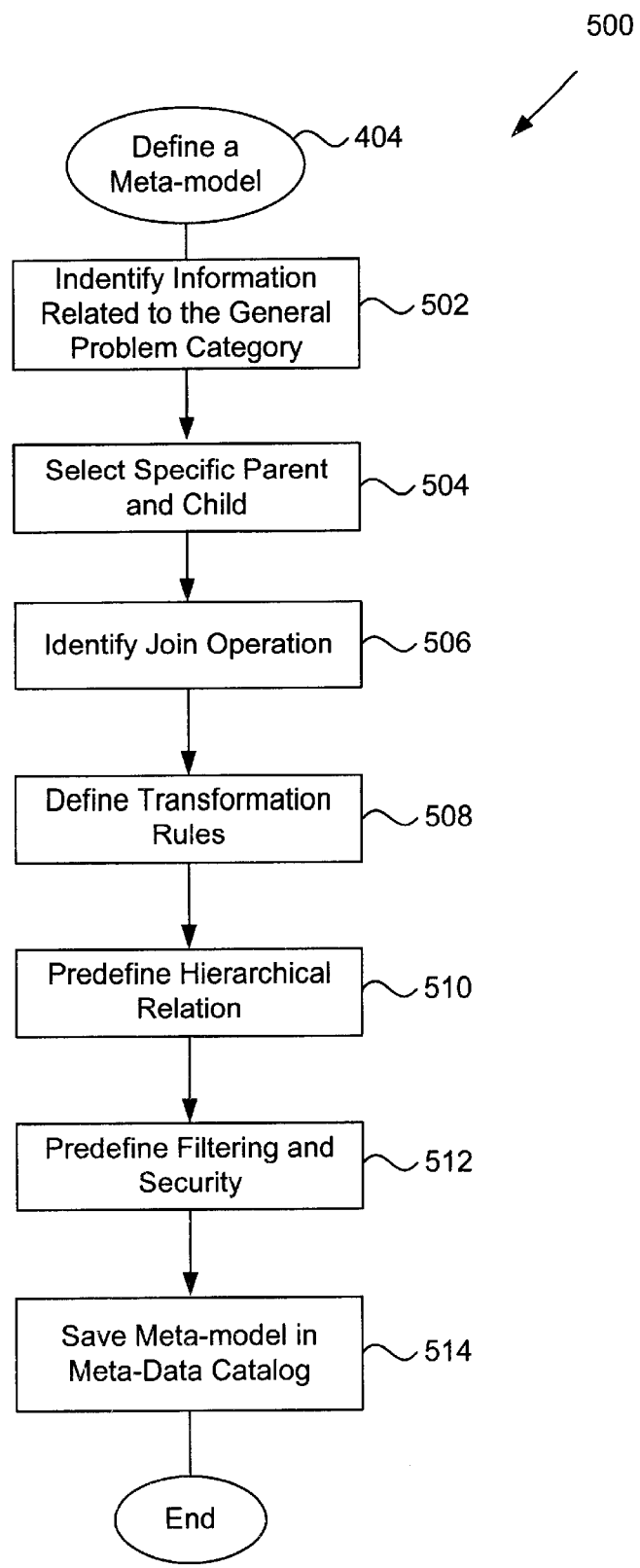
FIG. 5 illustrates a method of defining a Meta-model, in accordance with yet another embodiment of the present invention.

FIG. 5 is a flow chart illustrating a method 500 for defining a Meta-model (also noted as 404 in FIG. 4.) Initially, as noted by operation 502 of FIG. 5, information related to the general problem category previously defined (in operation 402 of FIG. 4) is identified. By way of example, identification of information related to a general problem category can entail scanning various tables and/or marking various information in a source database.

Next, in operation 504, one or more specific parent-child relationships are selected. To illustrate, consider the case when tables 1A–1C have been identified as database tables with information related to general problem category of"sales". In that case, for table 1A "product category" and "product subcategory" can be selected respectively as a parent-child relationship. As another example, in the case of table 1C, region and sub-region can be selected respectively as a parent-child relationship.

Join operations needed to address a problem relating to the general problem category are identified in operation 506. As noted earlier, in order to address an analytical problem, it is often necessary to combine several database tables. This can generally be referred to as identifying and performing "join" operations. By way of example, tables 1A–1C may need to be "joined" together to address a particular problem relating to "sales." As will be appreciated by those skilled in the art not all necessary "join" operations need to be identified in operation 504. Further, it is conceivable that a particular problem may require "join" operations not readily ascertainable at the time the Meta-model is defined.

Furthermore, as it will be appreciated by those skilled in the art, identified "join" operations do not have to be performed when a Meta-model is being defined. Thus, in some cases, it may be more efficient to perform some or all of the "join" operations as soon as they are identified. Alternatively, in other cases, it may be more desirable to perform the identified "join" operations at a later time, e.g., when the Meta-outline is created or when the multidimensional output is generated, possibly at run time.

Figures 1B, 1C:
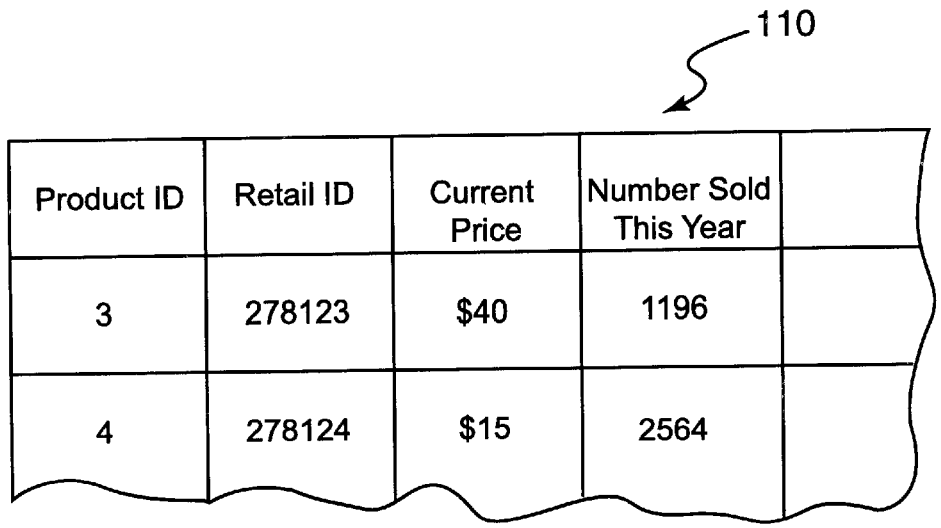

It should be noted that some tables may not have an existing parent-child relationship or an existing parent-child relationship may not be selected for a particular table. To facilitate discussion, table 110 of FIG. 1B provides an example of a table with relatively more factual data. This factual data relates to information of table 100 of FIG. 1A. In other words, table 1B contains factual information relating to general category of "sales", e.g., "current price" and "number sold this year". Thus, a parent/child relationship may not be present or selected for a database table, e.g, database table 1B. Nevertheless, the information in table 1B may need to be combined ("joined") with other tables, e.g., table 1A, in order to generate a multidimensional output related to general category of "sales".

In operation 508 of FIG. 5, transformation rules can optionally be defined for one or more specific parent-child pairs previously selected in operation 504. "Transformation" as used herein generally refers to transforming data from how it is represented in a source database to a different form, e.g., a more suitable representation for a user. By way of example, a simple transformation rule can be to transform the source database representation of "ABC:123:8887514" to "jeans", and so on. As it will be appreciated by those skilled in the art, the transformation rules do not have to be performed when they arc defined, i.e., when Meta-model is defined. The transformation rules arc performed at run time when the Meta-outline is created, in accordance with a particular embodiment of the present invention.

In addition to transformation rules, one or more hierarchical relationships can optionally be predefined when a Meta-model is defined, as noted by operation 510 of FIG. 5. As will be discussed later, at least one hierarchical relationship is typically defined for each selected dimension related to a multidimensional output. This hierarchical relationship can be recursively applied. Although hierarchical relationships are typically defined when Meta-outline is created, it should be noted that it would more efficient to pre-define certain relationships when a Meta-model is defined. To illustrate, it may be more efficient to predefine product and product category of table 1A as a parent/child relationship respectively.

Filters and security parameters can also be optionally predefined, as noted in operation 512 of FIG. 5. Filtering of data generally refers to any desirable processing of data. By way of a simple example, it may be desirable to focus on a few parameters that are of interest and effectively ignore other parameters, e.g., "retail ID" of FIG. 1B. Filtering may also be applied to further condense the information that is generated in the Meta-model.

Filtering can be defined based on input provided by a user. The user is typically someone with technical knowledge and familiarity with the source database, e.g., a database administrator, or a system manager. As previously noted, data filters can be defined after a Meta-model is defined and a Meta-outline is created. However, as will be appreciated by those skilled in the art, filtering parameters can also be pre-defined when the Meta-model is being defined. Security parameters can also be optionally predefined when a Meta-model is defined. Among other things, security parameters can be defined to limit access to information available in the source database. As noted with respect to FIG. 4, security parameters can be defined after a Meta-model has been defined and a Meta-outline is created. However, as will be appreciated by those skilled in the art, it may be desirable to more efficiently predefine some security parameters when the Meta-model is defined. By way of example, a Meta-model can be defined to restrict access to some parameters, e.g., employee salaries, internal structure and so forth. In addition, security can be implemented as to prevent certain hierarchical relationships from being defined and/or to protect access to certain hierarchical relationships and/or related data.

Finally, in operation 514, the Meta-model can be stored, e.g., stored in a Meta-data catalog 320, in accordance with a preferred embodiment of the present invention. As noted earlier, a Meta-outline and other information necessary to generate multidimensional output can also be saved in the Meta-data catalog 320. Meta-model can be stored in the Meta-data catalog 320 prior to creation of a Meta-outline. Alternatively, as previously noted with respect to FIG. 4, a Meta-model can be created before the corresponding Meta-outline is created but the Meta-model maybe stored in the Meta-data catalog 320 after a Meta-outline is created and/or stored (see 408 of FIG. 4).

As will be appreciated by those skilled in the art, among other things, a catalog can provide faster and more efficient access to information needed to generate multidimensional output. In addition, information saved in a catalog can be reused, for example, to re-generate the same or similar multidimensional outputs based on a particular Meta-model. Storing information in a catalog is especially useful in situations when the same or similar multidimensional outputs will be re-generated frequently.

Figure 6:
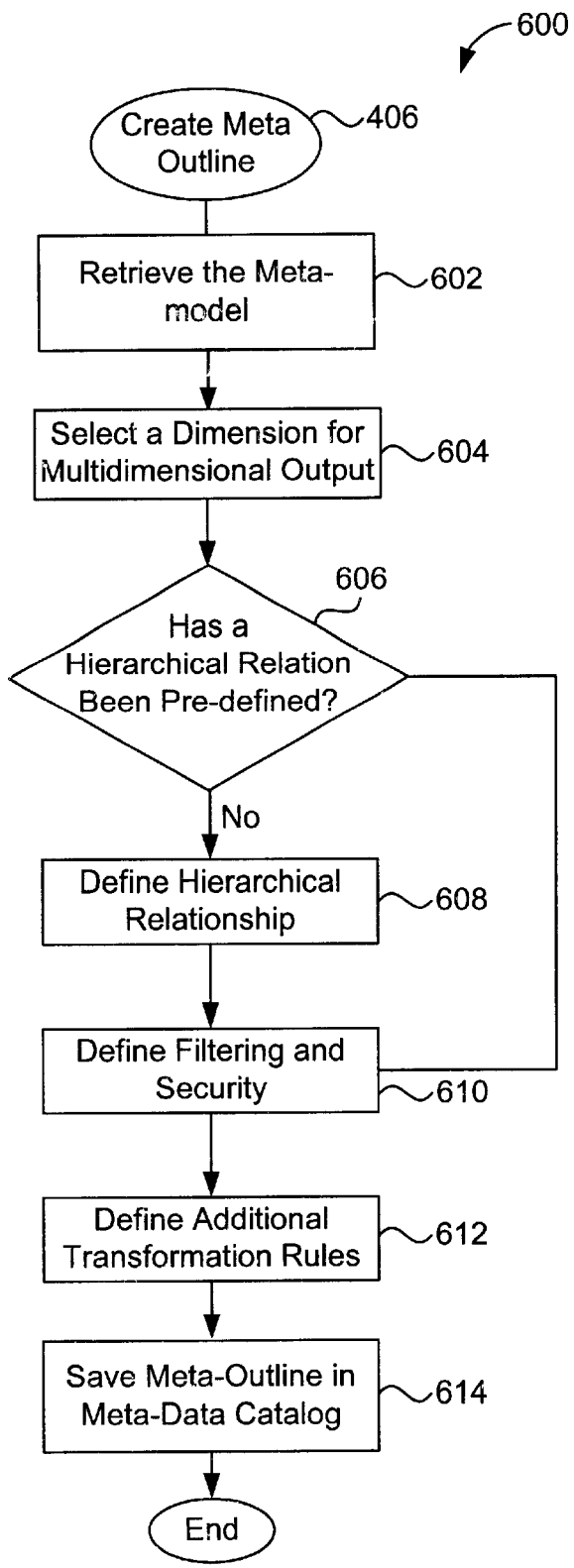
FIG. 6 illustrates a method of creating a Meta-outline, in accordance with an embodiment of the present invention.

FIG. 6 is a flow chart illustrating a method 600 for creating a Meta-outline (also noted as operation 406 in FIG. 4), in accordance with a preferred embodiment of the present invention. Initially, in operation 602, the Meta-model previously defined is retrieved. As discussed earlier, the Meta-model can be stored in the Meta-data catalog 320. Thus, in that case, it can be retrieved from the Meta-data catalog 320.

Next, in operation 604, one or more dimensions are selected for the multidimensional output that is to be generated. The selected dimensions typically relate to a particular problem, e.g., to determine $3^{rd}$ quarter sales for a product category sold in a specific region, for which at least two different dimensions need to be considered (i.e., "product category" and "topology", as illustrated by database tables of FIGS. 1A and 1B). After one or more dimensions are selected, a determination is made in decision 606 as to whether at least one hierarchical relation has been already pre-defined for each of the dimensions.

As previously discussed with respect to FIG. 5, one or more hierarchical relationships can be pre-defined when a Meta-model is created (see 510 of FIG. 510). If at least one hierarchical relationship is not already pre-defined for a selected dimension, then one or more hierarchical relationships are defined in operation 608. In the case when at least one hierarchical relationship has been pre-defined and there is no need or desire to define additional hierarchical relationships, then the method 600 proceeds to operation 610. It should be understood that even if there is a pre-defined hierarchical relationship, still more hierarchical relationships can be defined in operation 608.

Once at least one hierarchical relationship has been defined the method proceeds to operation 610 where additional filtering and security parameters may optionally be defined. Filtering and security parameters can be defined in a similar manner as discussed with respect to FIG. 5. Filters can be defined by a user who is typically someone with knowledge about the general problem category and interest in solving a related problem, e.g., a business manager of a department store. In addition to filtering, security parameters can also be optionally predefined at the time when the Meta-outline is created. Among other things, security parameters can be defined to generally limit access to information available to different users.

As will be appreciated by those skilled in the art, it may be desirable to more efficiently predefine some security parameters when the Meta-outline is created. By way of example, the Meta-outline can be created so that access to certain parameters is restricted, e.g., employee salaries, internal organization and so forth. In addition, Meta-outline can be defined to prevent certain hierarchical relationships from being defined. Thus, certain hierarchical relationships can be excluded from the Meta-outline. In this manner, additional security can be implicitly defined for a multidimensional database system.

In operation 612, transformation rules can optionally be defined. As previously discussed with respect to FIG. 5, transformation rules can optionally be defined for one or more specific parent-child pairs selected. As noted earlier, transformation rules are typically performed at run time when multidimensional output is generated. Finally, in operation 614, the Meta-outline can be stored, e.g., stored in a Meta-data catalog 320, in accordance with a preferred embodiment of the present invention.

Figure 7:
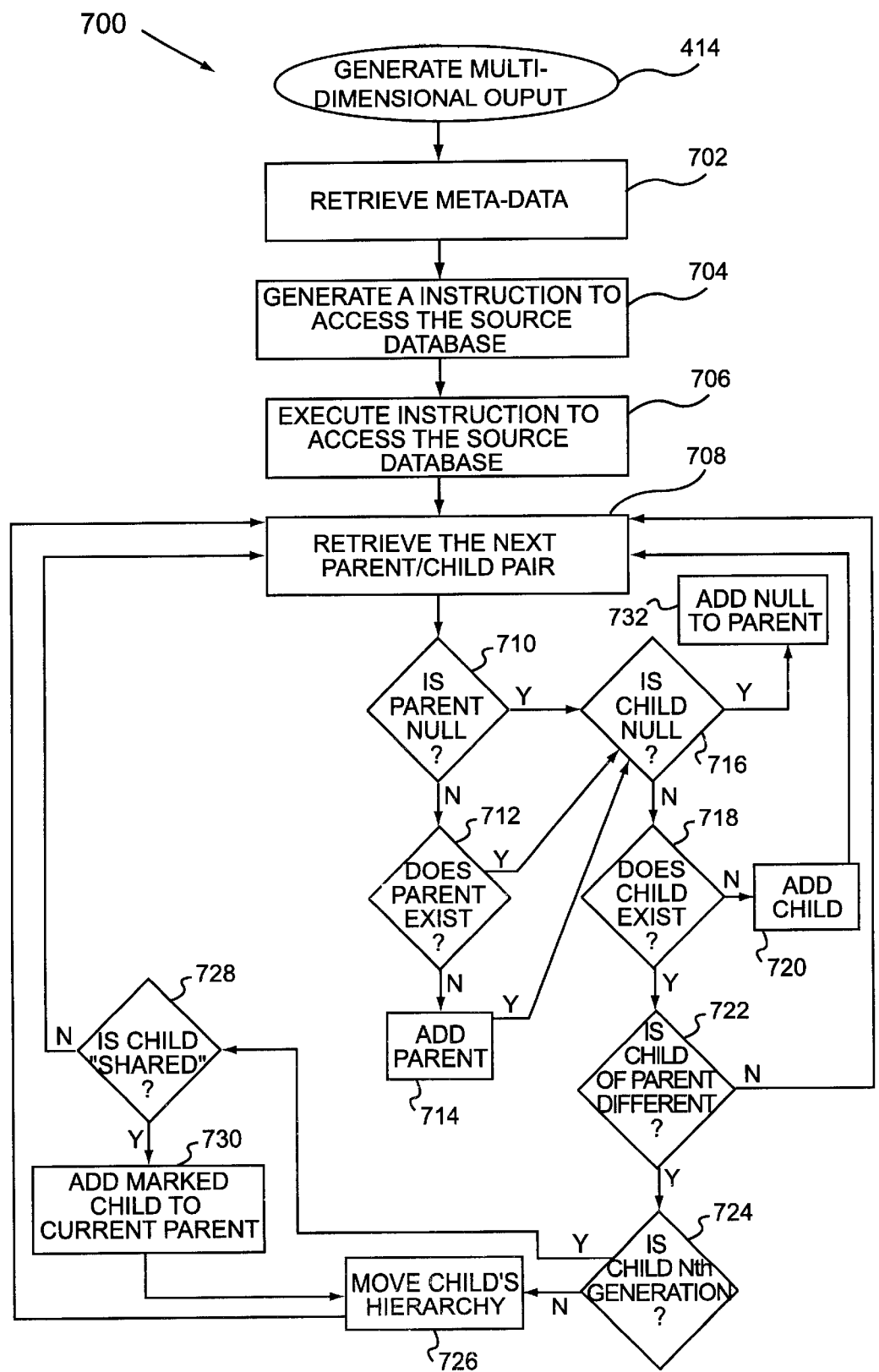
FIGS. 7–8 illustrates a method of generating multidimensional output, in accordance with still another embodiment of the present invention.

FIG. 7 is a flow chart illustrating a method 700 for generating multidimensional output (also noted by 414 of FIG. 4), in accordance with a particular embodiment of the present invention. Initially, in operation 702, Meta-data is retrieved. Meta-data can include a Meta-model, a Meta-outline, and any other information that may be necessary to generate multidimensional output. As discussed earlier, Meta-data is stored and retrieved from a catalog, e.g., Meta-data catalog 320, in accordance with a preferred embodiment of the present invention.

In operation 704, once Meta-data is retrieved, specific instructions are generated to access information needed to generate multidimensional output. These specific instructions are generated based on Meta-model and Meta-outline, in accordance with a preferred embodiment of the present invention. Information necessary for generating multidimensional output is generally available from a source database. By way of example, SQL instructions are generated to accesses information in a source database. Once an instruction has been generated it can be executed to access the source database, in operation 706.

As will be appreciated, the present invention advantageously allows for creation of multidimensional output without requiring several passes to be made through the source database. Multidimensional output is generated efficiently, based on a row by row analysis of hierarchical relationships that have been defined for a Meta-outline. To facilitate understanding, a simplified example illustrated in FIG. 8 will be discussed in conjunction with the rest of FIG. 7.

Table 800 of FIG. 8A contains some hierarchical relationships that maybe defined for a particular dimension, e.g., "geography." Table 800 represents "Meta-data" created and possibly saved in the Meta-data catalog 320, e.g., as a part of a Meta-outline. Although for ease of illustration, table 800 has been represented as a linear table, as will be understood by those skilled in the art, a wide variety of data structures and methods are available for storing and maintaining hierarchical relationships. Parent and child shown in columns 802 and 804 respectively are parent/child pairs related to a particular dimension, i.e., "geography". By way of example, in row 806, Akron is the parent of District1 (i.e., District1 is geographically contained in the city of Akron).

After generating and executing instructions needed to access a source database, method 700 proceeds to retrieve next parent/child pair, in operation 706 of FIG. 7. To illustrate, in the simple example of the table 800, next parent/child pair is represented by a row 806, i.e., Akron/District1. Next, a determination is made in decision 710 as to whether parent (Akron) is NULL. In the case of Akron/District1, since the parent is not NULL, method 700 proceeds to operation 712 where another decision is made as to whether the parent exists, i.e., has already been considered in the hierarchical structure that is to be build. The hierarchical structure is related to a dimension of multidimensional output that is to be generated. Since in the case of Akron/District1, parent (Akron) has not been encountered before, method 700 can proceed to operation 714 where parent (Akron) is added to a hierarchical structure illustrated by FIG. 8B.

In a similar manner, in decision 718 a decision is made as to whether child (District 1) exists. Again, since in the case of Akron/District1, the child (District1) has not been encountered before, method 700 can proceed to operation 720 where the child (District1) is added to the hierarchical structure. Thus, at this point, parent/child pair represented by row 806 has been considered and the resulting hierarchical structure is illustrated by FIG. 8C.

Method 700 resumes at operation 708 where the next parent/child pair is retrieved. In the example illustrated, row 808 represented by parent/child pair East/N.Y. is retrieved. The method proceeds in a similar manner as discussed with respect to row 806 to analyze the parent/child pair represented by row 806 and a resulting hierarchical structure is illustrated by FIG. 8D. As shown in FIG. 8D, the two identified parent/child pairs are disjointed, i.e., the relationship between the parent/child pairs is unknown.

Next, method 700 resumes at operation 708 where the next parent/child pair is retrieved, i.e., row 810 represented by parent/child pair N.Y./Akron is retrieved. In this case, since the parent (N.Y) already exists in hierarchical structure illustrated in FIG. 8D, method 700 proceeds from decision 712 to decision 716. Child (Akron) is not NULL, thus, method 700 proceeds to decision 718. Since child (Akron) also exists (see FIG. 8D), the method proceeds to decision 722 where a determination is made as to whether a different parent/child pair has been identified. In this case both Akron and N.Y already exist in FIG. 8D, however, the parent/child pair N.Y./Akron has not been represented. Thus, method 700 can proceed from decision 722 to decision 724. The determination made in decision 724 will be discussed later. Assuming method 700 next proceeds to 726, all of the children of child (Akron) are moved under parent (N.Y) as illustrated by the resulting tree illustrated in FIG. 8E.

Figure 8E:
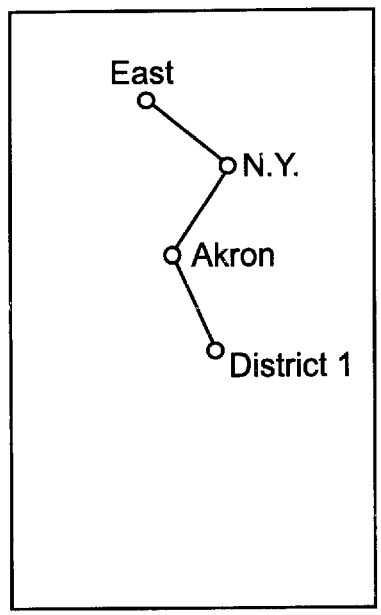
Figure 8F:
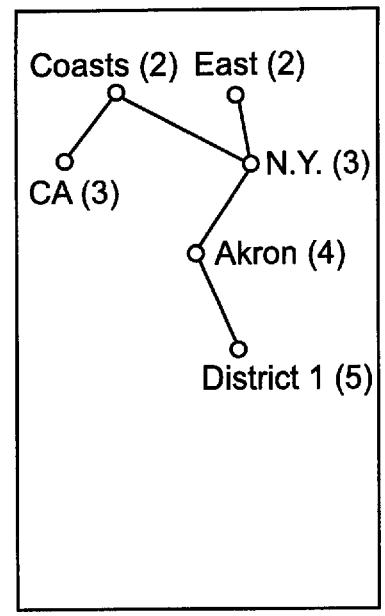
Figure 8G:
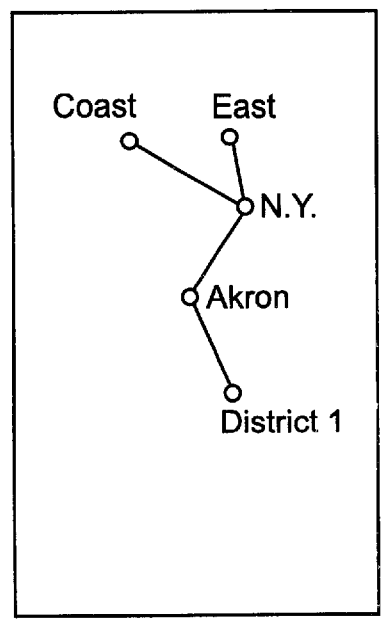
Figure 8H:
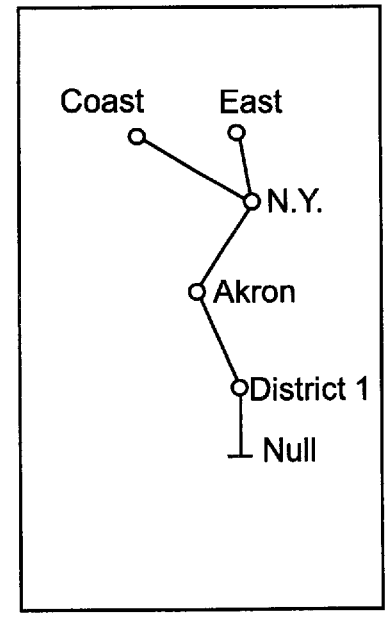

Decision 724 will be discussed now with respect to the next row retrieved, i.e., row 812 representing parent/child pair Coasts/N.Y. As can be determined from rows 808 and 812 of FIG. 8A, N.Y is a child of both the East and Coasts. N.Y can be referred to as a "shared child." This situation is also illustrated in FIG. 8G, where N.Y is depicted as a child of Coasts and East. As shown in FIG. 8F, the dimension of "geography" can be represented as a multilevel tree, where for example, N.Y. and CA are at level 3. In accordance with a particular embodiment of the present invention "shared children" can be assigned to a particular level, i.e., to an n-th generation, where n is a predetermined integer. By way of example, all "shared children" can be assigned to level 3. Thus, in the case of parent/child pair Coasts/N.Y, when method 700 proceeds to decision 724, since N.Y is designated as a level 3 child, a determination is made as to whether N.Y is a "shared child". In this case since N.Y is a "shared child" and is marked as such and the current parent of N.Y (Coasts) is added to generate a hierarchical structure illustrated in FIG. 8G.

When row 814 of FIG. 8A is retrieved by method 700, since the parent (District1) is not NULL and already exists, the method 700 proceeds through decision 712 to decision 716. In this case, since the child is NULL, method 700 proceeds to operation 732 where the NULL child is added to the parent. This results in the tree depicted in FIG. 8H.

As illustrated by the example discussed, the present invention can advantageously be employed to generate multidimensional output efficiently. Multidimensional output can be generated without requiring several passes to be made through various data tables and/or having to normalize data. The present invention takes advantage of hierarchical relationships that are defined in a Meta-model and/or a Meta-outline to quickly and efficiently generate multidimensional output.

As will be appreciated by those skilled in the art, method 700 can be performed more efficiently and quickly at runtime, in accordance with preferred embodiment of the present invention. Furthermore, multidimensional output can be generated without having to statically allocate a large amount of memory and without requiring an unreasonable amount of system resources.

This invention has numerous advantages. One advantage is that multidimensional output can be generated more quickly and efficiently in a manner that is more suitable for multidimensional database environments. Another advantage is that this invention does not require normalization of data prior to creation of multidimensional output. Thus, a source database can remain in its original relational format. Still another advantage of the invention is that it is cost effective and that relatively simple implementations are possible.

Although only a few embodiments of the present invention have been described, it should be understood that the present invention may be embodied in many other specific forms without departing from the spirit or scope of the invention. By way of example, although method 400 has been set forth in terms of a particular sequential order for the purposes of this explanation, it should be apparent that in many cases the ordering is not critical. For example, filtering and/or security (noted respectively as operations 410 and 412) can be defined prior to storing Meta-data (noted as 408). Some operations may be combined or eliminated and others may be parsed into multiple operations. For example, defining transformation rules or predefining hierarchical relationships in FIG. 5 (508 and 510 respectively) can be eliminated. As another example, generation of instructions to accesses the source database (represented as 706) can be parsed into several different operations. As is known by those skilled in the art, the same functionality can also be obtained by using different operations as well.

Further, various tables have been described as having particular data structures, however, some of the described fields may be eliminated in some embodiments, and other fields may be added. For example, "retail ID" in database table 1B may be readily eliminated. As another example, additional information could be added to table 1B, e.g., "purchasing cost".

What is claimed is:

1. A method of producing multidimensional output from a source database, the multidimensional output providing a solution to a problem relating to one or more dimensions of data associated with the source database, the method comprising:

accessing said source database, wherein said accessing can be performed by a multidimensional integrator;

defining an application related to the one or more dimensions of data associated with the source database;

defining a Meta-model for the application, the Meta-model relating to the one or more dimensions of data associated with the source database, wherein said defining can be performed by a multidimensional architect; and creating a Meta-outline for the application, the Meta-outline including the one or more dimensions of data associated with the source data base; and generating multidimensional output based on at least one hierarchical relationship, the at least one hierarchical relationship being defined for the source database and relating to the application, the multidimensional output providing a solution to the problem related to the application.

2. A method as recited in claim 1, wherein for each of the one or more dimensions of data related to the source database at least one hierarchical relationship is defined.

3. A method as recited in claim 1, wherein the Meta-outline is created based on the Meta-model.

4. A method as recited in claim 1, wherein the multidimensional output is generated based on the at least one hierarchical relationship that is defined in the Meta-outline.

5. A method as recited in claim 1, wherein the method further comprises storing the Meta-model in a catalog.

6. A method as recited in claim 1, wherein the method further comprises storing the Meta-outline in a catalog.

7. A method as recited in claim 1, wherein the method further comprises storing in a catalog the Meta-model, the Meta-outline, and any other information needed to generate the multidimensional output.

8. A method as recited in claim 1, wherein the method further comprises defining and applying filtering parameters, the filtering parameters being used to generate the multidimensional output.

9. A method as recited in claim 1, wherein the method further comprises defining and implementing security parameters, the security parameters being used to generate the multidimensional output.

10. A method as recited in claim 1, wherein the application is a general problem category.

11. A method as recited in claim 1, wherein the defining of the Meta-model further comprises:

identifying information in the source database related to the application;

selecting one or more specific parent/child relationships form the identified information in the source database; and identifying join operations to be performed on the identified information in the source database.

12. A method as recited in claim 11, wherein the defining of the Meta-model further comprises:

performing the identified join operations on the identified information;

defining transformation rules to be applied to the identified information, the transformation rules being applied to generate multidimensional output;

predefining one or more hierarchical relationships, wherein each predefined hierarchical relationship is related to at least one dimension of the multidimensional output to be generated;

defining and applying filtering parameters, the filtering parameters being used generate the multidimensional output;

defining and applying security parameters, the security parameters being used to generate multidimensional output; and storing the Meta-model in a catalog.

13. A method as recited in claim 1, wherein creating the Meta-outline further comprises:

selecting one or more dimensions for the multidimensional output;

determining whether at least one hierarchical relationship has been defined for each of the one or more selected dimensions;

defining at least one hierarchical relationship for a dimensions when there is not at least one hierarchical relationship pre-defined for the dimension.

14. A method as recited in claim 13, wherein the creating of the Meta-outline further comprises:

defining transformation rules to be applied on the identified information in the source database, the transformation rules being applied to generate multidimensional output;

defining and applying filtering parameters, the filtering parameters being used to generate die multidimensional output;

defining and applying security parameters, the security parameters being used to generate the multidimensional output; and storing the Meta-outline in a catalog.

15. A method as recited in claim 14, wherein the creating of the Meta-outline further comprises retrieving the Meta-model from a catalog.

16. A method as recited in claim 1, wherein the generation of the multidimensional output further comprises:

generating instructions for accessing the source database;

executing the instructions to access the source database;

processing a parent/child pair relating to at least one dimension of data associated with the source database; and generating the multidimensional output based on the processing of the parent/child pair.

17. A method as recited in claim 16, wherein the parent/child pair is in a set of parent/child pairs and the set is processed sequentially.

18. A method as recited in claim 17, wherein the generation of the multidimensional output further comprises:

selecting a parent/child pair from the set to be processed; and determining a hierarchical relationship based on the selected parent/child pair, the hierarchical relationship relating to at least one dimension of the multidimensional output.

19. A method as recited in claim 17, wherein generation of the multidimensional output further comprises:

selecting a parent or a child from the parent/child pair selected to be processed;

adding the selected parent or the selected child to a representative hierarchical relationship associated with a dimension of the multidimensional output; and modifying the representative hierarchical relationship based on the processing of the parent child pairs.

20. A method as recited in claim 16, wherein the multidimensional output is generated at run time.

21. A method as recited in claim 16, wherein a parent/child pair is retrieved from the source database.

22. A method as recited in claim 16, wherein the processing of the parent/child pairs comprises;

determining whether the parent is null;

determining whether the child is null;

determining whether the parent already exists in a relational structure that is representative of the hierarchical relationship associated with a dimension of the multidimensional output;

determining whether the child exists in the relational structure;

adding the parent to the relational structure;

adding the child to the relational structure;

modifying the relational structure based on the processing of the parent child pairs.

23. A method as recited in claim 22, wherein the parent/child pair is in a set of parent/child pairs and the set is processed sequentially.

24. A method as recited in claim 1, wherein the multidimensional output is generated at run time.

25. A method as recited in claim 1, wherein the Meta-model is defined based on input that is provided by a user.

26. A method as recited in claim 1, wherein the Meta-outline is created based on input received by a user.

27. A multidimensional integration system for producing multidimensional output from a source database, the multidimensional output providing a solution to a problem relating to one or more dimensions of data associated with the source database, the multidimensional integration system comprising:

a multidimensional data integrator for accessing the source database;

a multidimensional architect for defining a Meta-model associated with an application; and a multidimensional designer for creating a Meta-outline for the application, the Meta-outline including the one or more dimensions of data associated with the source database; wherein the multidimensional output is generated based on at least one hierarchical relationship, the at least one hierarchical relationship being defined for the source database and relating to the application, the multidimensional output providing a solution for the problem related to the application.

28. A multidimensional integration system as recited in claim 27, wherein the multidimensional data integrator interacts with the multidimensional architect and the multidimensional designer to define the Meta-model and to create the Meta-outline.

29. A multidimensional integration system as recited in claim 27, wherein the Meta-model is defined based on input received from a user of the source database.

30. A multidimensional integration system as recited in claim 27, wherein the Meta-outline is created based on an input that is received from a user of the source database.

31. A multidimensional integration system as recited in claim 27, wherein the multidimensional data integrator interacts with a server using an application programming interface to generate the multidimensional output.

32. A multidimensional integration system as recited in claim 27, wherein the instructions generated by the multidimensional data integrator are SQL instructions.

33. A multidimensional integration system as recited in claim 27, wherein the multidimensional integration system further comprises a catalog used to store information needed to generate the multidimensional output and wherein the multidimensional integrator retrieves information from the catalog.

34. A multidimensional integration system for producing multidimensional output from a source database, the multidimensional output providing a solution to a problem relating to one or more dimensions of data associated with the source database, the multidimensional integration system comprising:

a multidimensional data integrator for accessing the source database and for producing instructions used to generate the multidimensional output;

a multidimensional architect for defining a Meta-model associated with an application;

a multidimensional designer for creating a Meta-outline for the application, the Meta-outline including the one or more dimensions of data associated with the source database; and a catalog for storing information needed to generate the multidimensional output, wherein the multidimensional output is generated based on at least one hierarchical relationship, the at least one hierarchical relationship being defined for the source database and relating to the application, the multidimensional output providing a solution for the problem related to the application.

35. A multidimensional integration system as recited in claim 34, wherein the instructions produced by the multidimensional data integrator are received by a server.

36. A multidimensional integration system as recited in claim 34 wherein for each of the one or more dimensions of data related to the source database at least one hierarchical relationship is defined.

37. A multidimensional integration system as recited in claim 34 wherein the multidimensional output is generated at runtime.

38. A multidimensional integration system as recited in claim 34 wherein input is received by the multidimensional integration system to define the Meta-model or to create the Meta-outline.

* * * * *